T. LOUGHLIN.
NUT LOCK.
APPLICATION FILED JUNE 15, 1909.
940,605.
Patented Nov. 16, 1909.
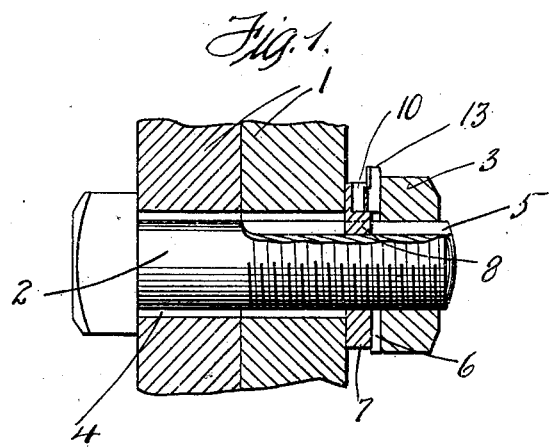
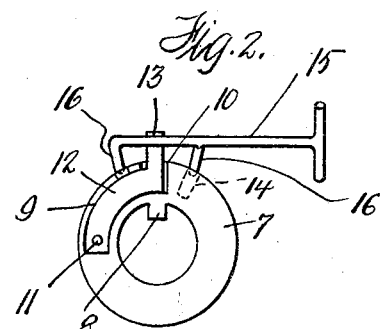
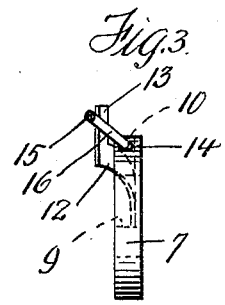
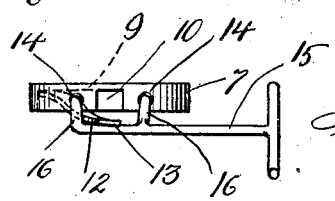
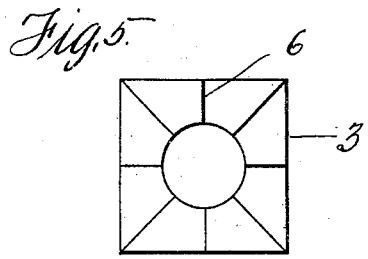
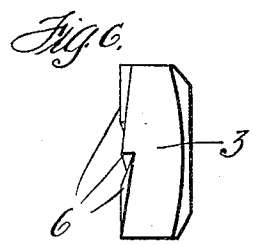
Inventor
THOMAS LOUGHLIN
Witnesses
By
Attorneys

UNITED STATES PATENT OFFICE.

THOMAS LOUGHLIN, OF NEW KENSINGTON, PENNSYLVANIA.

NUT-LOCK.

940,605.

Specification of Letters Patent.

Patented Nov. 16, 1909.

Application filed June 15, 1909. Serial No. 502,231.

*To all whom it may concern:*

Be it known that I, THOMAS LOUGHLIN, a citizen of the United States of America, residing at New Kensington, in the county of Westmoreland and State of Pennsylvania, have invented certain new and useful Improvements in Nut-Locks, of which the following is a specification, reference being had therein to the accompanying drawing.

This invention relates to nut locks, and the invention has for its objects to provide a nut lock that can be easily and quickly applied to a bolt for locking a nut thereon, whereby the nut cannot become accidentally displaced; and to afford means for quickly removing a nut should it be necessary.

Further objects of the invention are to provide a simple and inexpensive locking washer for accomplishing the desired result; to so design and construct the parts of the washer as to give the requisite strength, and to supply movable parts in connection with the nut lock having the desirable quality and durability and so related as to be readily assembled and repaired.

Further objects of the invention are to provide a nut lock that can be used in connection with rail joints, bridges, rolling stock and structures subjected to vibrations, and to provide a nut lock that can be easily placed in position by unskilled labor.

I accomplish the above and other important objects with a mechanical construction illustrated in the accompanying drawing, which forms a part of this specification, and in which:

Figure 1 is a longitudinal sectional view of the nut lock, Fig. 2 is a front elevation of the locking washer, Fig. 3 is a side elevation of the same, Fig. 4 is a plan of the washer, Fig. 5 is a rear elevation of a nut constructed in accordance with my invention, and Fig. 6 is a side elevation of the same.

In the drawings, 1 denotes two pieces of metal adapted to be connected together by a bolt 2 and a nut 3, said bolt extending through alining openings 4 formed in the material 1. The bolt 2 has the threaded end thereof provided with a longitudinally disposed groove 5, and the rear face of the nut 3 is provided with ratchet teeth 6.

7 denotes a metallic washer having an inwardly projecting lug 8 adapted to engage in the groove 5 of the bolt 2, said washer being placed upon the bolt against the material 1 prior to screwing the nut upon said bolt. The washer 7 is provided with a segment-shaped groove 9, the upper end of said groove terminating in a recess 10 adjacent to the lug 8 of the washer. Fixed in the lower end of the groove 9, as at 11, is a segment-shaped resilient detent or spring 12 having a projection 13 at the free end thereof. The edge of the washer 7 at each side of the recess 10 is provided with two sockets 14.

15 designates a wrench adapted to be used in connection with the nut lock, the wrench having two prongs 16 adapted to engage in the sockets 14, while that portion of the wrench between said prongs engages the projection 13 of the detent 12.

After the washer 7 has been slipped upon the bolt 2, the nut 3 is screwed upon the bolt until the ratchet teeth 6 of said nut engage the detent 12, and as the nut is tightened upon the bolt, the detent and the projection 13 thereof eventually engages one of the teeth 6 of the nut 3 and prevents a rear rotation of said nut. To remove the nut 3 from the bolt, the wrench 15 is brought into use, and by positioning the prongs 16 of said wrench in the sockets 14 of the washer, at that portion of the wrench between said prongs in front of the projection 13, the wrench can be swung rearwardly to move the projection 13 into the recess 10, and then the nut 3 can be easily unscrewed.

It is thought that the utility and operation of the nut lock will be fully understood without further description, and while in the drawings there is illustrated a preferred embodiment of the invention, I do not care to confine myself to the exact construction and arrangement of the parts of the nut lock.

Having now described my invention what I claim as new, is:—

In a nut lock, a washer provided with a resilient detent adapted to engage a ratchet-faced nut for locking the nut, said detent projecting beyond the outer edge of the washer, and said washer having its outer edge provided with a pair of radially disposed sockets, one arranged at each side of the projecting portion of the detent and adapted to receive a tool for engagement with the projecting portion of the detent to release the latter from the nut.

In testimony whereof I affix my signature in the presence of two witnesses.

THOMAS LOUGHLIN.

Witnesses:
Geo. D. Hamor,
J. I. Galbreath.